US005187933A

United States Patent [19]

Nikolaus

[11] Patent Number: 5,187,933

[45] Date of Patent: Feb. 23, 1993

[54] VARIABLE DISPLACEMENT PUMP WITH HYDRAULIC ADJUSTMENT FOR CONTROLLING THE DELIVERY RATE AND/OR THE PRESSURE WITH RESPECT TO AT LEAST TWO CONSUMERS

[75] Inventor: Heinrich Nikolaus, Hamburg, Fed. Rep. of Germany

[73] Assignee: Mannesmann Rexroth GmbH, Lohr/Main, Fed. Rep. of Germany

[21] Appl. No.: 458,577

[22] Filed: Dec. 29, 1989

[30] Foreign Application Priority Data

Dec. 30, 1988 [DE] Fed. Rep. of Germany ....... 3844401

[51] Int. Cl.[5] ....... F16D 31/02

[52] U.S. Cl. ....... 60/452; 60/444; 91/454; 91/457; 91/443; 91/448; 91/461; 91/405; 91/406

[58] Field of Search ....... 91/443, 454, 457, 461, 91/405, 406, 398, 448; 60/444, 452

[56] References Cited

U.S. PATENT DOCUMENTS

| | | | |
|---|---|---|---|
| 3,935,707 | 2/1976 | Murphy et al. | 60/444 |
| 4,201,052 | 5/1980 | Breesen et al. | 91/454 X |
| 4,353,289 | 10/1982 | Lonnemo | 91/461 X |
| 4,401,009 | 8/1983 | Zeuner et al. | 91/454 X |
| 4,407,122 | 10/1983 | Nanda | 91/461 X |
| 4,475,442 | 1/1984 | Breeden | 91/461 |
| 4,571,941 | 2/1986 | Aoyagi et al. | 91/461 X |

FOREIGN PATENT DOCUMENTS

| | | |
|---|---|---|
| 3428403 | 4/1985 | Fed. Rep. of Germany . |
| 3644745 | 7/1988 | Fed. Rep. of Germany . |
| 3702000 | 8/1988 | Fed. Rep. of Germany . |
| 3732816 | 4/1989 | Fed. Rep. of Germany . |

*Primary Examiner*—Edward K. Look
*Assistant Examiner*—Todd Mattingly
*Attorney, Agent, or Firm*—Harness, Dickey & Pierce

[57] ABSTRACT

The invention relates to a variable displacement pump supplying fluid to a number of consumers. The pump control for adjusting the delivery rate is actuated by a signal which is produced by the respective highest loaded consumer. The signal is provided by a valve, in particular a pressure compensating valve which is associated with the consumer, and which valve opens a spool land when the valve becomes positioned at its control end range. A pressure signal from any pressure fluid source is delivered through the land to the pump controller. The control, according to the invention, offers a broad variety of possibilities for arranging the pressure compensation valve at various locations, engaging the valve by a variety of pressure differences, and using a number of pressure fluid sources of provide for the signal pressure to actuate the pump controller.

30 Claims, 5 Drawing Sheets

2 22 30 31 24 4 59 60 27 26 28 1 6 20 CON-SUMER 3 3' CON-SUMER 16 15 17 b a 18 200 12 8 9 5 35 T PST 10

320
CONTROLLER
2
310
30
31
4
27
26
28
60
6
1
CON-
SUMER
3
CON-
SUMER
3'
(POSITION-
SENSOR)
16
300
17
o
b
a
15
18
12
8
9
5
35
T
PST
10

2
22
4
59
38
60
20
6
CON-
SUMER
3
16
15
18
o
b
a
36
9
5
T
10

2
22
15
59
o
20
b
a
4
42
6
60
CON-
SUMER
3
36
9
5
T
10

3
362
352
50
360
364
51
5
200
354
56
55
15
12
17
a
b
o
T
58
2
20
30
59
1
28
26
22

VARIABLE DISPLACEMENT PUMP WITH HYDRAULIC ADJUSTMENT FOR CONTROLLING THE DELIVERY RATE AND/OR THE PRESSURE WITH RESPECT TO AT LEAST TWO CONSUMERS

FIELD OF THE INVENTION

The present invention relates to a variable displacement pump with hydraulic adjustment for controlling the delivery rate and/or the pressure for at least a pair of consumers, each consumer cooperating with a metering throttle and a valve.

BACKGROUND OF THE INVENTION

According to the prior art, the hydraulic adjustment of a variable displacement pump is controlled by a load responsive signal, i.e., the load pressure of the highest loaded consumer, in order to increase the delivery rate of the pump. It is further known to provide a delivery rate control valve for the hydraulic adjustment, wherein the piston of the valve is in communication via a signal conduit and a shuttle valve row to all consumers in order to supply the respective highest load pressure of a consumer via the signal conduit to the control valve.

In a situation wherein the variable displacement pump is delivering fluid at its maximum delivery rate, yet an increase in the delivery volume for a consumer is nevertheless required, which requirement is communicated via the signal conduit, the hydraulic system falls into a mode of undersupply. To remedy this condition, it is known to reduce the flow rate through the consumers; for example, by reducing the flow rate through the consumers by means of respective pressure compensation valves which are correlated to the consumers (German Patent Application P 35 32 816.9). To reduce the flow rate through the consumers, it is further known (P 36 44 745.5) to provide the respective pressure compensation valves with a supplementary control land. When the pressure compensation valve is in its open end position, the supplementary control land is operable to permit a reduction in the pilot control pressure for the hydraulically controlled directional valves. Accordingly, when such a pressure compensation valve locates at such an end position, the flow rate through all consumers is reduced. Thus, according to the prior art, the control signals for increasing the delivery rate of a hydraulic pump, or for reducing the fluid flow rate through the consumers, was obtained from the highest loaded (i.e., load leading) consumer, once the pressure compensation valve of such consumer reached the end of the control range.

SUMMARY OF THE INVENTION

It is an object of the present invention to control the pump controller of a variable displacement pump in a novel manner to make it possible to freely select the signal controlling the pump control to substantially increase the versatility of the hydraulic system.

According to the invention, a particular valve, which is associated with a corresponding consumer (which consumer is load leading), is brought into a valve position in which a signal, responsive to the condition of this consumer, is delivered to the adjustment means of the pump in order to control the delivery rate of the pump.

It is, thus, evident that the control signal for the pump control is delivered from the particular load leading consumer which had called for an increased delivery rate, which is realized by a valve (pressure compensation valve) arranged in the hydraulic conduit of the consumer. Accordingly, the valve associated with the corresponding load leading consumer reaches an end position in which a control land opens and permits the generation and communication of a load-responsive signal, or a signal which is not load-responsive, to the pump controller. This signal acts to increase the delivery rate. Thus, when one of the consumers needs an increased delivery rate, the valve provided for this consumer reaches its end position in order to supply a signal to the conduit leading to the pump controller, thereby effecting an increase of delivery rate. The pressure supplied to the signal conduit may be vented through a throttle to a reservoir allowing to decrease pump delivery again.

According to a particular embodiment, the valves for supplying the signals to the signal conduit connected to the adjustment means are constituted by pressure compensation valves, with one each arranged in combination with the directional valve means of one of the consumers. The pressure compensation valve has an additional control edge when the valve is in an end position to communicate the signal conduit to a control pressure source.

This principal arrangement may encompass a broad variety of different systems. Accordingly, the control pressure source for the pressure signal of the pump controller may be freely selected. The signal conduit may be connected to a separate pressure source of relatively low pressure or to a line leading from the pump to the consumer. The connection may be provided upstream or downstream of the directional valve. Since the connection is performed by means of the particular position of the valve, or the pressure compensation valve, one is free to select the location of arranging the pressure compensation valve, i.e., either in the feed line upstream of the consumer or in the return line between the consumer and the reservoir. It is further possible to realize valve systems for throttling in the feed line as well as in the return line. Of course, the actuating pressure range of the pump control must be selected in response to the control pressure available in the signal conduit.

Additional advantages and benefits of the present invention will become apparent upon reading of the description of the preferred embodiments taken in conjunction with the accompanying drawings.

DETAILED DESCRIPTION

Figure 1:
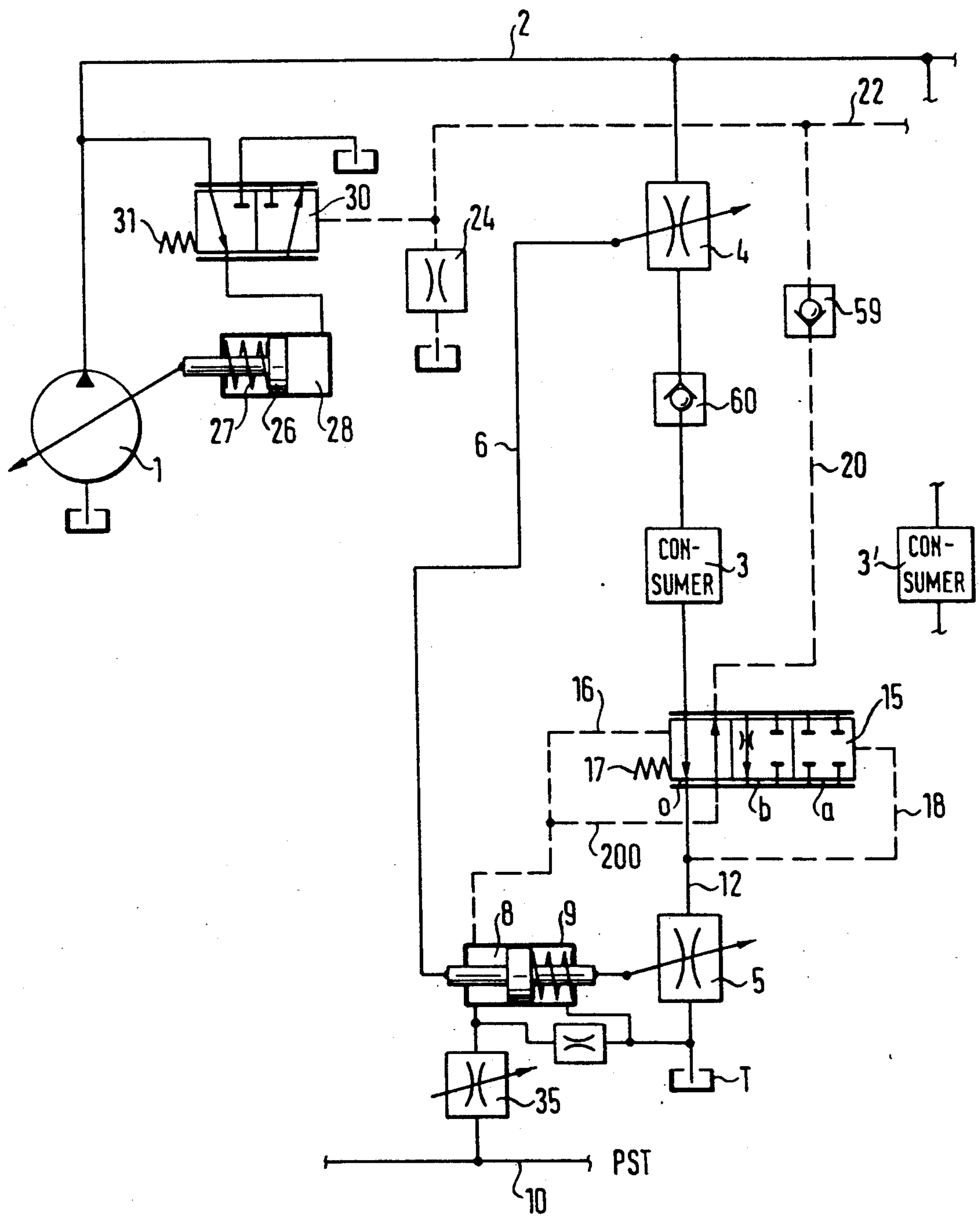
FIG. 1 is a schematic diagram of a hydraulic system to control the pump controller by means of a pressure compensation valve which is arranged in the return line between the consumer and the return control land of the metering throttle.
Figure 6:
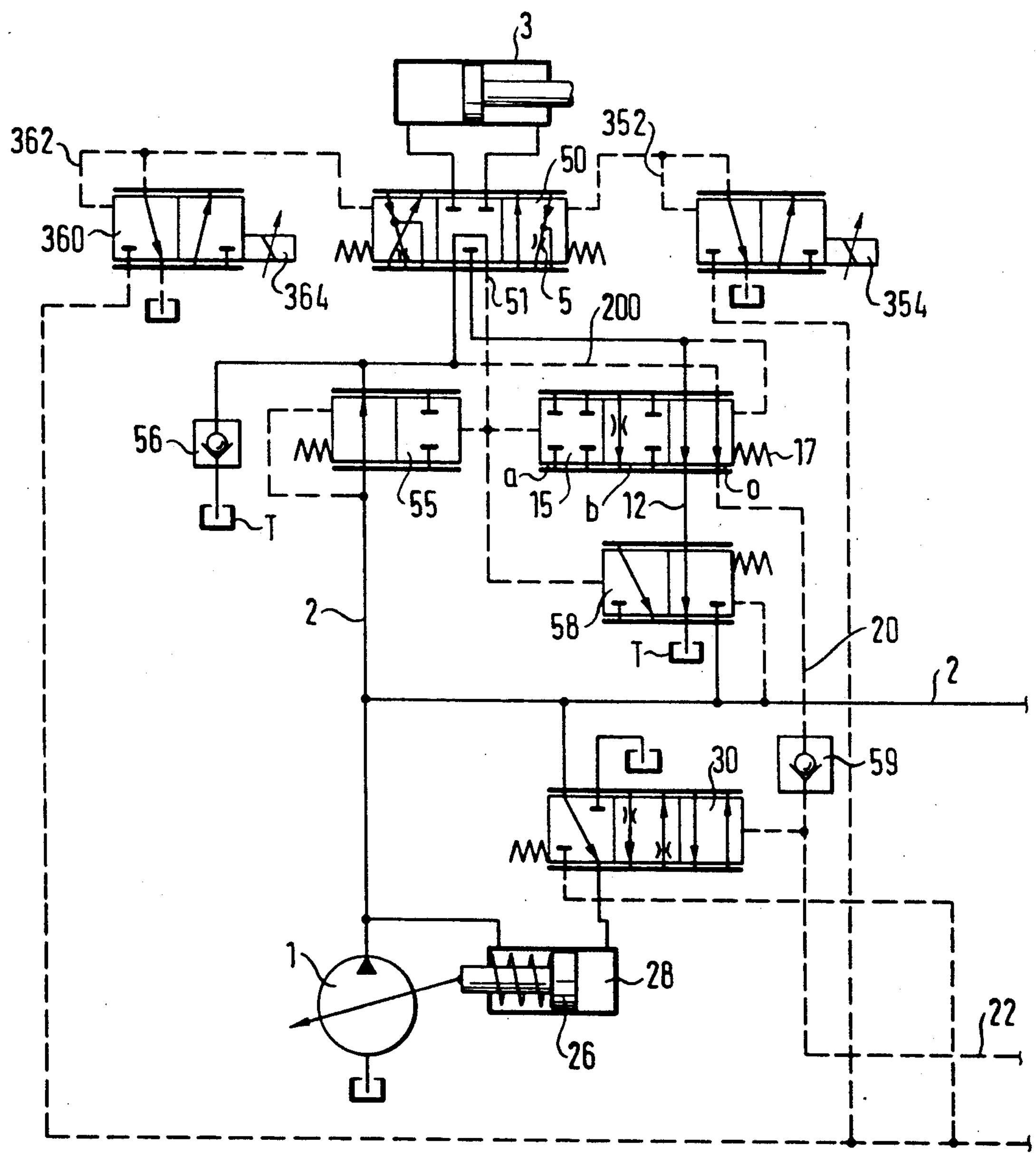

Referring now in detail to the drawings, FIG. 1 shows a variable displacement pump 1 feeding fluid to a pump pressure line 2 to which a number of consumers are connected. The flow rate through the illustrated consumer denoted by the reference numeral 3 is controlled by a directional valve having a metering throttle control edge 4 arranged in the feed line and a further metering throttle control edge 5 arranged in the return line to the reservoir T. It is to be noted that both the control edges 4 and 5 are provided on a spool member of a conventional type of directional valve, which structural relationship is indicated by the functional line 6. Particular attention is hereby directed to the fact that the directional valve 4, 5, 6 may be of the type as shown via conventional graphic symbols in FIG. 6, and identified generally by the reference numeral 50. The return line metering throttle control edge 5 is shown in FIG. 6. With further reference to FIG. 1, a check valve 60, which functions as a load holding valve, is provided between the consumer 3 and the control edge 4. The directional valve 4, 5, 6 is hydraulically controlled by supplying a control pressure to the chamber 8 of the pilot cylinder 9. The chamber 8 is connected to a control pressure line 10 via a manually operated valve 35 to control the displacement of the spool member of the directional valve 4, 5, 6. A pressure compensation valve 15 is arranged in the return line 12 of the consumer 3 to the reservoir T. The spool member of the pressure compensation valve 15 is urged towards closing by the pressure upstream of the return line control edge 5, which pressure is delivered through the line 18. The spool member of the pressure compensation valve 15 is urged towards opening by the control pressure in the line 16 and by a spring 17 Line 16 is connected to the control chamber 8. The function of the pressure compensation valve 15 arranged in the return line 12 is similar as with a conventional pressure compensation valve. That is, when the consumer runs too fast, due to a low load, the pressure in the line 18 is increased and, accordingly, the pressure compensation valve throttles the flow rate through the consumer returning to the reservoir T. On the other hand, should load increase, and a situation arises wherein the consumer 3 runs too slow, the pressure in the line 18 decreases and the valve opens in order to increase the flow rate and to make the consumer 3 run faster. The closed position of the pressure compensation valve 15 is represented by the reference letter a, while the reference letter b indicates the control position, and the reference letter o refers to a fully open working position.

For example, when the consumer 3 is load leading, and thus demanding an increased delivery rate of the pump 1, the pressure compensation valve 15 is moved to its maximum opening. This occurs when both pressures engaging the opposite spool front faces, which are delivered through the lines 16 and 18, are equal to each other, so that the end of the control position of the pressure compensation valve 15 is reached. In such a case there is a hydraulic undersupply, and the pressure compensation valve 15 is caused to reach the position o. This event causes an additional control edge to continuously open, through which the control pressure signal in the line 16 is delivered through a signal line 200, 20, 22 to a pump controller. In the present embodiment, the pump control is engaged by a signal delivered from the separate pressure source. In addition, similar signal lines 20 of any other consumers (3', and possibly others which are not illustrated) are connected to the pump pressure line 2, and further, are connected to the common signal line 22. A check valve 59 is located in each of the additional signal lines 20. As the additional control edge of the pressure compensation valve 15 continuously opens, the pressure in the signal line 20 increases to pivot the pump 1 towards an increased delivery rate. As soon as the delivery rate satisfies the demand, the signal pressure between the additional control edge of the pressure compensation valve 15, which additional control edge closes, and the throttle 24, which effects venting of the pressure to the reservoir T, decreases.

The pump control arrangement is set forth next. The adjusting piston 26 of the hydraulic adjustment is urged by a spring 27 towards a maximum delivery rate. The piston 26 is additionally urged by the pressure in the chamber 28 towards a minimum delivery rate. The pressure in the chamber 28 is adjusted by a delivery rate control valve 30. The spool member of the delivery rate control valve 30 is engaged by a spring 31 which acts to decrease the delivery rate of the pump 1. In opposition to the force provided by the spring 31, the pressure in the signal line 22 acts to initiate an increase of the pump delivery rate.

Figure 1B:
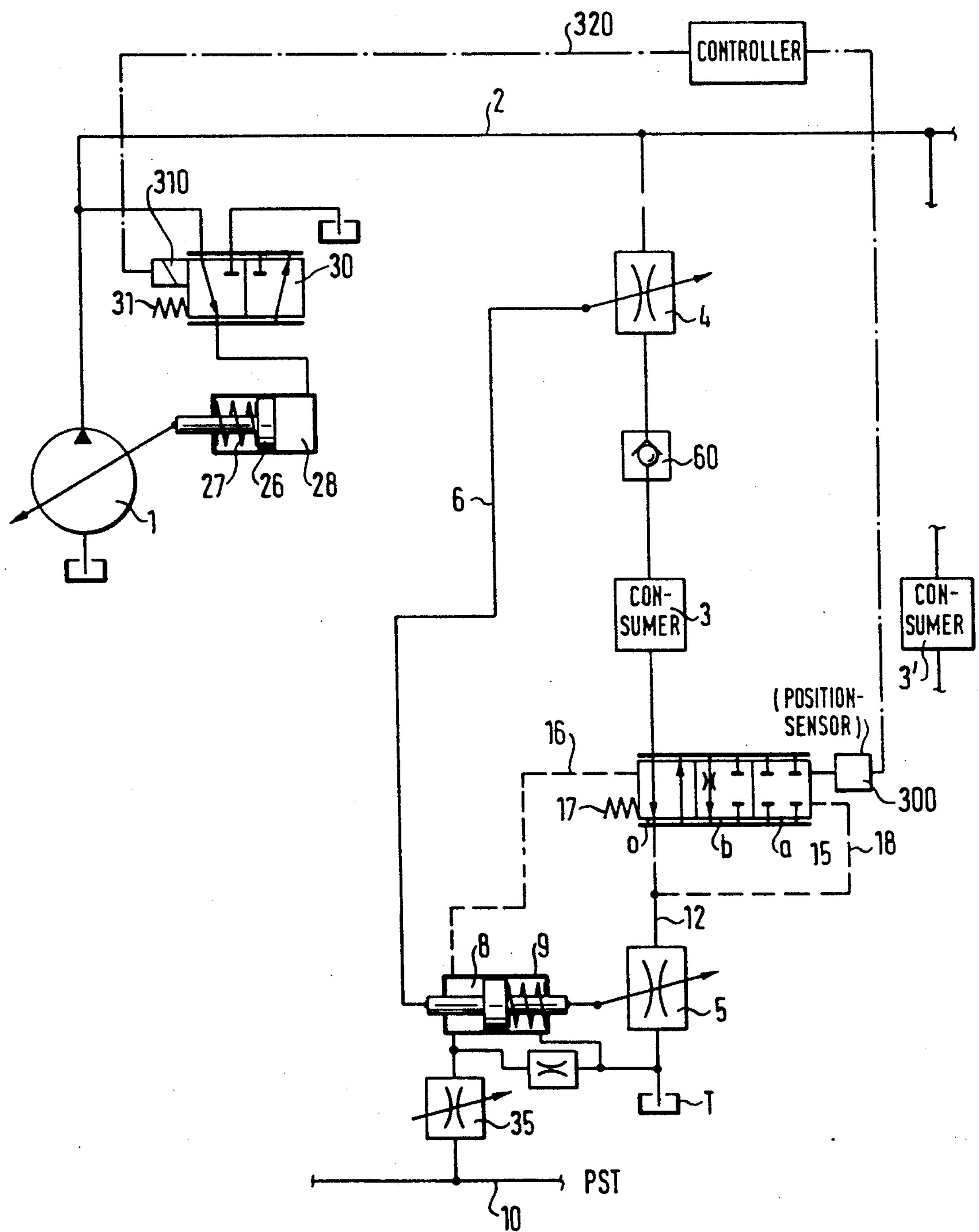
FIG. 1B is a schematic representation of an electrical pump control.

The embodiment shown in FIG. 1 thus teaches that it is possible to use a signal for the pump control which signal is totally independent of the pressure level at the pressure compensation valve itself. Referring to FIG. 1B, instead of the hydraulic signal, i.e., the control pressure $P_{ST}$ in the pressure control line 10, an electrical signal could be used to control the pump control valve 30. According to such an electrical control, the end position of the pressure compensation valve 15 is electrically detected, as by way of a position sensor 300, to produce the electrical control signal, thereby triggering a control device 310 (for example, a solenoid) via an electrical lead 320.

A further advantage is the possibility to individually adjust the pressure difference applied to the pressure compensation valve 15 for actuation. For example, the pressure difference may be used additionally to produce a desired value for the flow rate.

As shown in FIG. 1, the pressure prevailing in the line 16, acting on the valve spool 15, is the same pressure as the pilot control pressure for actuating the directional valve 4, 5, 6. This means that the control pressure which acts to adjust the directional valve 4, 5, 6 and to determine the desired value of flow rate is correlated to the pressure of the desired valve pressure difference acting on the pressure compensation valve 15. This improves the sensitivity of the control operation and makes possible a linear control characteristic since adjusting the metering throttle 5 determines the flow rate cross section A, while the valve 15 controls the flow rate pressure responsive according to the term $\sqrt{p}$.

Thus, the flow rate in the return line is determined according to the following equation:

$$Q \sim A\sqrt{p}.$$

It is further possible to obtain great flow rates for valves of predetermined size since $\sqrt{p}$ is increased with maximum flow rate.

The system makes it further possible to reduce the control pressure $P_{ST}$ in order to remedy an undersupply. To this end, a signal is produced when the valve 30 indicates maximum delivery rate to reset manually (in a conventional manner), the control valves 35 in order to reduce the pilot pressure delivered to the pilot valves 9. The latter mentioned structure and operation shall now be more fully detailed. As set forth above, and illustrated in FIG. 1, the control valve 35 can be set manually to provide an increase or decrease of the fluid pressure within the chamber 8 of the pilot cylinder 9. The pilot cylinder, in turn, controls the setting of the directional valve 4, 5, 6. Thus, manual operation of the valve 35 ultimately effects the fluid flow through the consumer 3. The present invention contemplates an arrangement, and operation, wherein a signal is generated when the valve 30 indicates to an operator a condition in which the pump 1 is delivering working fluid at its maximum delivery rate. Such signal is intended to communicate to an operator who can manually reset the valve 35 that the valve 35 should be reset to a position whereat the pressure $P_{ST}$ delivered from the control pressure line 10 to the pilot cylinder 9 is reduced, thereby reducing the flow rate through the consumer 3, and likewise through other consumers 3' where applicable and desirable. In this way, a remedy is achieved for a situation in which there might otherwise not be a sufficient supply of working fluid to satisfy the operational demand of such consumers.

The remaining figures, discussed below, show a number of embodiments to illustrate manners in which a pressure compensation valve may be arranged in combination with a consumer. However, it is common to all pressure compensation valves that an additional control edge is provided to deliver a continuously varying pressure signal to the signal conduit 22.

Figure 2:
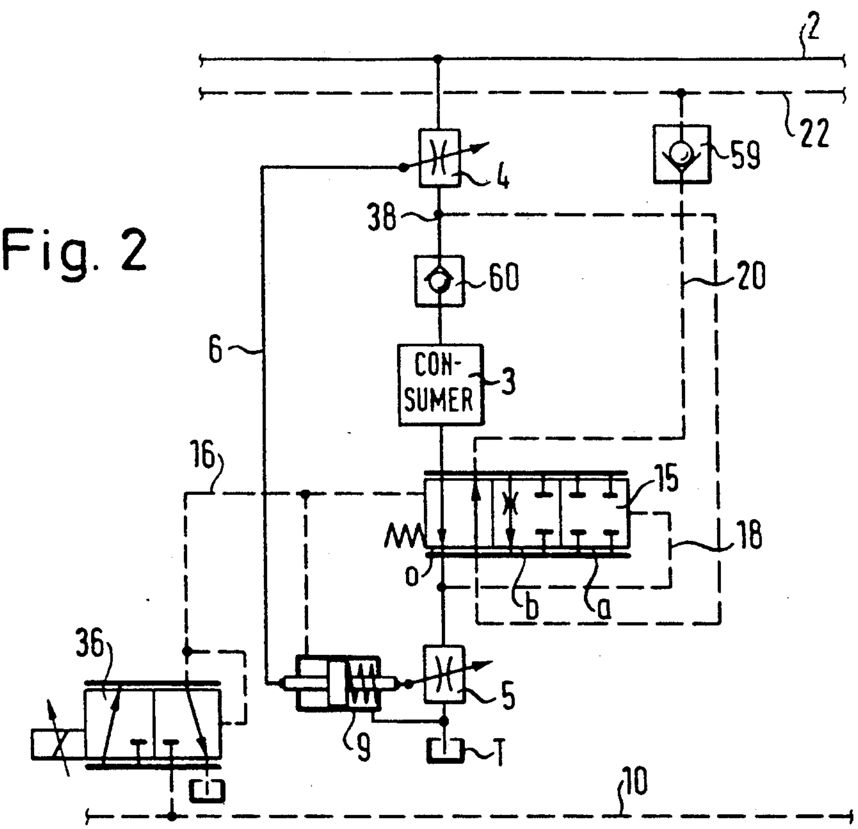
FIG. 2 is an alternative embodiment having the pressure compensation valve arranged in the return line, in a fashion similar to that in the embodiment of FIG. 1.

FIG. 2 shows the pressure compensation valve 15 arranged in the return line, as was the case with the embodiment of FIG. 1. The pressure compensation valve 15, as well as the hydraulic adjustment 9 of the directional valve 4, 5, 6, is controlled by the pressure signal in line 16, which latter pressure is, in turn, determined by a pressure reducing valve 36 which is connected to a pressure control line 10. However, the control line 20, 22 is connected through the additional control edge of the pressure compensation valve 15, in its position o, to the feed line 38 at a location which is upstream of the consumer 3 and downstream of the feed control edge 4 of the directional valve 4, 5, 6. The signal line 22 is thus supplied with a high pressure control signal which is the load pressure signal upstream of the consumer 3.

Figure 3:
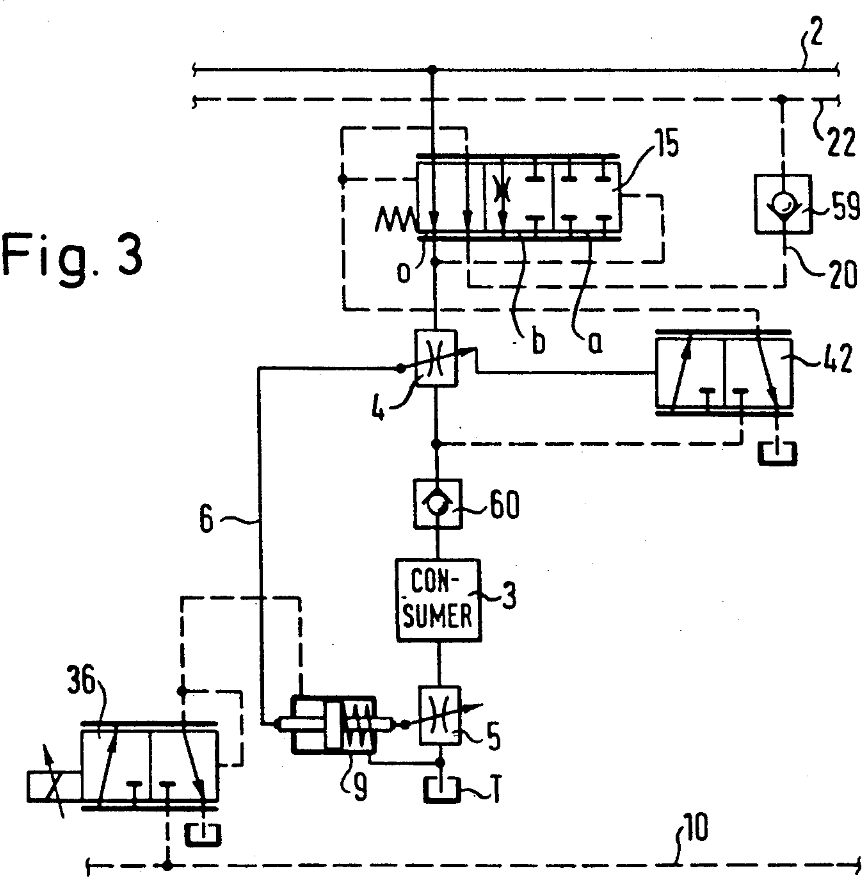
FIG. 3 is an alternative embodiment having the pressure compensation valve arranged in the feed line at a location which is upstream of the control edge of the bidirectional valve.

According to FIG. 3, the pressure compensation valve 15 is arranged in the feed line at a location which is upstream of the control edge 4 of the directional valve 4, 5, 6. The pressure compensation valve 15 is responsive to the pressure difference prevailing across the metering throttle 4. The load pressure acting on the spring loaded side of the valve spool of the pressure compensation valve 15 is transmitted via a valve 42 which valve position is controlled together with adjusting the directional valve 4, 5, 6. The load pressure transmitted via valve 42 is further fed to the control signal line 20, 22 in the undersupply position of the pressure compensation valve 15.

Figure 4:
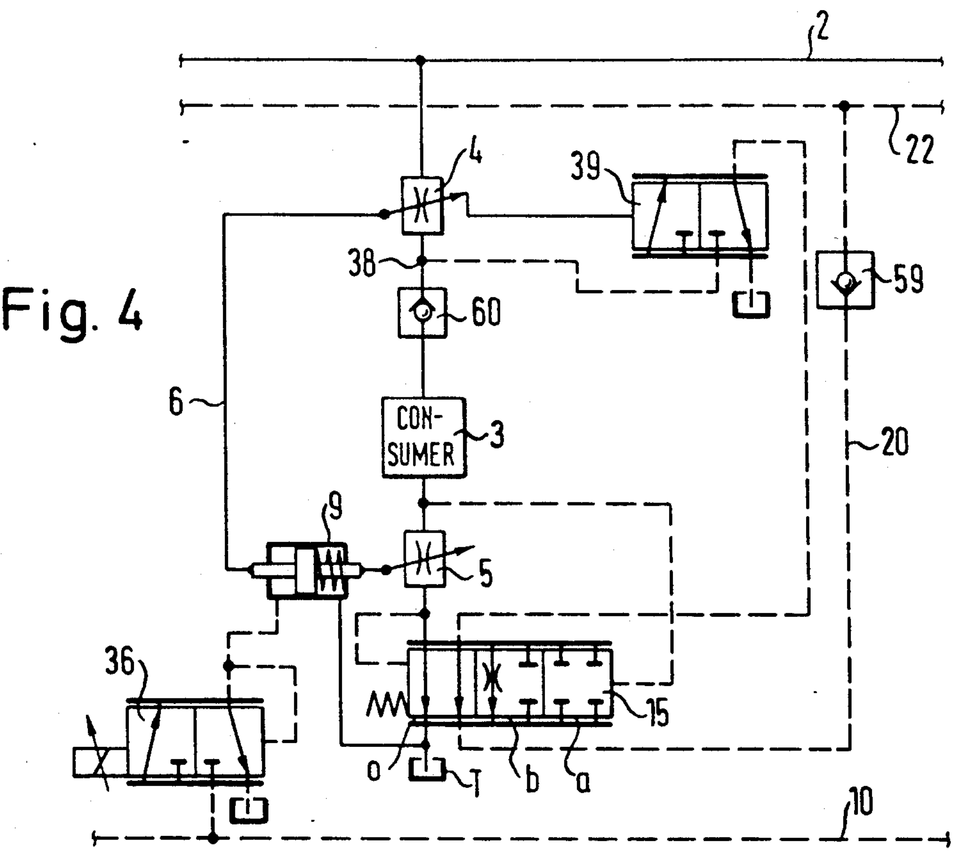
FIG. 4 is an alternative embodiment having the pressure compensation valve arranged in the return line at a location which is between the consumer and the reservoir.

In FIG. 4, the pressure compensation valve 15 is arranged in the return line at a location which is between the consumer 3 and the reservoir T, and further, is downstream of the return metering throttle 5 of the directional valve 4, 5, 6. The pressure compensation valve 15 is controlled by the pressure difference across the metering throttle 5. The load pressure of the consumer 3 is delivered from point 38 through valve 39, controlled in common with the spool of the directional valve 4, 5, 6, and further via the pressure compensation valve 15 in case of undersupply to the line 20, 22.

Figure 5:
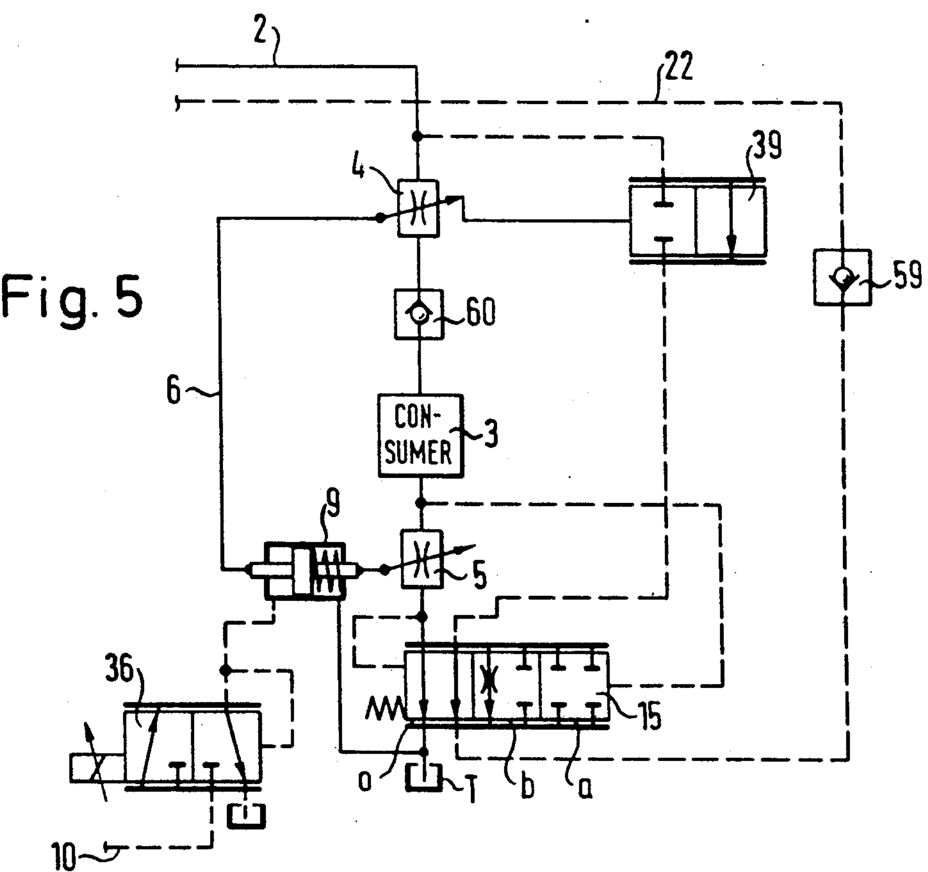
FIG. 5 is an alternative embodiment having the pressure compensation valve arranged in the return line at a location which is between the consumer and the reservoir, in a fashion similar to that in the embodiment of FIG. 4; and, FIG. 6 shows a schematic diagram including a pressure compensation valve located in the return line of the consumer to the reservoir including an anti-cavitation means and a return feed means.

FIG. 5, shows a further modification according to which the pressure compensation valve 15 is arranged at the same location as in FIG. 4 and is controlled, again, by the pressure difference across the return control edge 5. However, the pump pressure upstream of the feed control edge 4 of the directional valve 4, 5, 6 is transmitted via valve 39 and the pressure compensation valve 15 in the case of undersupply to the control line 22.

In summary, all the embodiments of FIGS. 2–5 relate to a high pressure system using high pressure as a signal pressure. This means that the pump delivery rate control valve 30 shown in FIG. 1 must be changed, in a conventional manner, such that the spool member of the pump delivery rate control valve 30 is not moved by the spring 31, but, instead, by the pump pressure, towards a position in which the pump 1 is returned to a lower delivery rate, by supplying pressure to the cylinder chamber 28.

FIG. 6 shows yet a further embodiment of the invention. In the embodiment of FIG. 6, a consumer 3 is controlled by a directional valve 50, which valve 50 is, in turn, controlled by actuating valves 350 and 360, each of these latter valves being controlled by a respective solenoid, 354 and 364, and in opposition thereto, a respective pressure line, 352 and 362. The pressure compensation valve 15 is arranged in the return line at a location which is between the directional valve 50 and the reservoir T. The spool member of the pressure compensation valve 15 is urged towards an opening position by a spring 17 and by the pressure upstream of the pressure compensation valve 15 and, in opposition thereto, is urged towards a closing position by the pressure upstream of the return control edge 5 of the directional valve 50. Such pressures are indicative of the pressure difference across the return control edge 5. The signal line 20 is fed by a pressure signal via the valve 15, which signal is taken from the feed line at a location which is between the pump pressure line 2 and the directional valve 50. The control signal, thus, is a high pressure signal which is fed to the pump controller when the pressure compensation valve 15 is in its end position o.

The embodiment of FIG. 6 is supplemented by an anti-cavitation means, which means includes an empty-cavitation valve 55 and a check valve 56. The pump pressure and a spring operate the valve 55 in a manner tending to position it in its open position, as illustrated. The load pressure prevailing at port 51 of the directional valve 50 acts in a manner tending to close the valve 55. In a situation wherein the consumer 3 is subjected to an external force, so that the consumer requires an additional draw of fluid from the pump line 2, the pressure difference between the pump pressure and the return pressure of the fluid which is displaced by the movement of the cylinder 3 operates the valve 55 in order to close it. Upon the occurrence of this latter event, the check valve 56 opens and allows fluid to be drawn directly from the reservoir T. This means provides for a substantial reduction of energy in the hydraulic system.

Still further with regard to the embodiment of FIG. 6, a return feed means is provided, which means includes a return feed valve 58 for allowing fluid communication between the pressure compensation valve 15 and the reservoir T or between the pressure compensation valve 15 and the pump pressure line 2, depending upon the current operating position of the return feed valve 58. The valve 58 is controlled by the pump pressure and a spring, which tend to position it towards the open position which is shown in FIG. 6, and by the return line pressure at the port 51 of the directional valve 50, which tends to position it towards its other working position. As long as the pump pressure in combination with the spring force is larger than the pressure in the return line, the valve 58 remains in the illustrated open position, and the fluid displaced from the pushing or trailing consumer 3 is delivered to the reservoir T. However, when the pressure in the return line increases to a point whereat it exceeds the pump pressure in combination with the spring force, the valve 58 is moved to its other working position and, thus, the displaced fluid is delivered to the pump pressure line 2, which event causes a further reduction in the pump adjustment to smaller delivery rates.

When the consumer 3 requires an additional draw of fluid, under conditions wherein the pressure compensation valve 15 is in the end position o and the empty-cavitation valve 55 is in its closed position, the signal pressure may not act on the pump delivery rate control valve 30 and in the signal line 20, as the volume drawn is not effected by the pump delivery rate.

When the valve 55 is in such a closed position, the pressure compensation valve 15 must not be operated to deliver control pressure to the signal line 20. To this end, the line 200, which transmits the control pressure signal, is connected immediately downstream of the empty-cavitation valve 55.

I claim:

1. A hydraulic control system for a variable displacement pump having a hydraulic adjustment for controlling the delivery of fluid from said variable displacement pump to at least two consumers, each of said consumers being supplied with fluid pressure from said pump through a respective circuit having a metering throttle which communicates with the respective circuit and is located within said hydraulic control system for selectively controlling the flow in a portion of the respective circuit and an automatic control valve which communicates with the respective circuit and is located within said hydraulic control system for maintaining pressure at a point in the respective circuit, the improvement comprising each of said automatic control valves being operable to a single, particular and unique position to provide a control signal for operating said hydraulic pump whereby the control signal is provided to the hydraulic adjustment which, in turn, controls the hydraulic pump; and wherein each of said automatic control valves are not operable for providing said control signal when not located at said single, particular and unique position.

2. The system of claim 1 wherein the control valves of the respective circuits are operative when in their positions to provide the highest pressure signals to the pump hydraulic adjustment.

3. The system of claim 1, wherein said control valve is a proportional valve.

4. The system of claim 1, wherein said control valve delivers the control signal to the adjustment means when the control valve is in an end position of its control range.

5. The system of claim 4, wherein said control valve is a pressure compensation valve for load compensating the flow rate through the respective consumer.

6. The system of claim 5, wherein said pressure compensation valve includes an end position in which a port is opened by a control edge for delivering said control signal.

7. The system of claim 1, wherein said control signal is a hydraulic pressure signal generated in a separate pressure source.

8. The system of claim 1, wherein said control signal is a load responsive pressure signal correlated to the highest loaded consumer.

9. The system of claim 1, wherein said control signal is a pilot pressure used to hydraulically actuate the metering throttle of the respective consumer.

10. The system of claim 1, wherein said control signal is an electrical signal.

11. The system of claim 1 in a hydrostatic system, comprising a primary hydraulic machine to generate a substantially constant pressure in a pressure line to which an adjustable second hydrostatic machine is connected as a secondary unit wherein said control signal is produced when the secondary unit is adjusted to its maximum displacement.

12. The system of claim 1, wherein the flow rate through the load leading consumer is reduced or, respectively the load leading consumer is switched off by the control signal of the load leading consumer independently of the pressure demand or the flow rate demand of the remaining consumers when the pressure and/or power limit of the variable displacement pump is exceeded.

13. The system of claim 12, wherein the demand of a consumer having the highest energy loss corresponding to a minimum load pressure is reduced or said consumer switched off when the pump power limit is exceeded.

14. The system of claim 5, wherein the respective pressure compensation valves of the respective consumers are each controlled by individually separated pressure signals.

15. The system of claim 14, wherein the respective pressure compensation valves are arranged between the variable displacement pump and the respective consumer.

16. The system of claim 15, wherein each pressure compensation valve has a spool member controlled by the pressure difference across the metering throttle.

17. The system of claim 14, wherein the pressure compensation valves are each arranged between a respective consumer and a return line to the reservoir, the metering throttle being positioned in the respective return line.

18. The system of claim 17, wherein the pressure compensation valves each are operated by the pressure difference across the respective consumer.

19. The system of claim 17, wherein the pressure compensation valves each are operated by the pressure difference across the respective metering throttle.

20. The system of claim 17, wherein the pressure compensating valves each are controlled by the pressure difference between the pressure at the metering throttle and the pressure of a separate pressure source.

21. The system of claim 20 wherein the hydraulic adjustment of the metering throttle and the respective pressure compensation valve are connected in common to a separate pressure source.

22. The system of claim 1, wherein a second directional valve is provided between the variable displacement pump and a metering throttle of the respective consumer which second valve is operated in response to the pressure difference across the consumer from an open position to a closed position in which the flow to the consumer is delivered via a check valve to a reservoir when the load is operated by an external force.

23. The system of claim 22, wherein said second valve is controlled by the pressure prevailing between the pump and a directional valve of the consumer and in opposition thereto by the pressure upstream of the metering throttle in a return line.

24. The system of claim 23, wherein a pressure compensation valve is provided between the metering throttle in the return line and the reservoir.

25. The system of claim 22, wherein the pressure control signal to be delivered to the pump adjustment means is tapped off immediately downstream of said second valve.

26. The system of claim 1 including a pressure compensation valve provided between a metering throttle in a return line of the consumer and a reservoir, wherein a third valve is provided in the return line between the pressure compensation valve and the reservoir which is operated in response to the pressure difference between the pump pressure and the return line pressure of the consumer when the consumer is moved by an external force to take a position in which the return line is in communication with the pump pressure line when the return line pressure exceeds the pump pressure.

27. The system of claim 26, wherein the metering throttle is constituted by a directional valve which provides an additional control edge to deliver the pressure between the consumer and the metering throttle in the return line.

28. The hydraulic system of claim 1, wherein the metering throttle is a metering throttle of a directional control valve controlling the communication of the pump with the consumer and of the consumer with a return conduit.

29. The hydraulic system of claim 28, wherein the metering throttle is in the connection between the pump and the consumer.

30. The hydraulic system of claim 28, wherein the metering throttle is in the connection between the pump and the return.

* * * * *